(12) United States Patent
Doyen et al.

(10) Patent No.: US 12,482,148 B2
(45) Date of Patent: Nov. 25, 2025

(54) BRAIN TRACTOGRAPHY BY SHADING FIBER BUNDLES

(71) Applicant: Omniscient Neurotechnology Pty Limited, Sydney (AU)

(72) Inventors: Stephane Philippe Doyen, Mount Kuring Gai (AU); Jake Robert Palmer, Springfield Lakes (AU); Hugh Monro Taylor, Point Piper (AU); Michael Edward Sughrue, Brighton le Sands (AU)

(73) Assignee: Omniscient Neurotechnology Pty Limited, Sydney (AU)

( * ) Notice: Subject to any disclaimer, the term of this patent is extended or adjusted under 35 U.S.C. 154(b) by 180 days.

(21) Appl. No.: 18/463,175

(22) Filed: Sep. 7, 2023

(65) Prior Publication Data

US 2024/0095974 A1 Mar. 21, 2024

Related U.S. Application Data

(60) Provisional application No. 63/408,374, filed on Sep. 20, 2022.

(51) Int. Cl.
*G06T 11/00* (2006.01)
*G06T 7/11* (2017.01)

(52) U.S. Cl.
CPC .............. *G06T 11/001* (2013.01); *G06T 7/11* (2017.01); *G06T 2207/10088* (2013.01); *G06T 2207/30016* (2013.01); *G06T 2207/30096* (2013.01); *G06T 2210/41* (2013.01)

(58) Field of Classification Search
CPC ............... G06T 11/001; G06T 7/11; G06T 2207/10088; G06T 2207/30016; G06T 2207/30096; G06T 2210/41
See application file for complete search history.

(56) References Cited

U.S. PATENT DOCUMENTS

| 9,569,840 | B2* | 2/2017 | Kim | ....................... A61B 5/748 |
| 11,055,849 | B2 | 7/2021 | Sughrue et al. | |
| 11,145,119 | B2 | 10/2021 | Sughrue et al. | |
| 11,423,543 | B2* | 8/2022 | Murray | .............. G01R 33/4806 |
| 2017/0076452 | A1* | 3/2017 | Yui | ........................... G06T 7/11 |
| 2021/0228143 | A1* | 7/2021 | Yeh | ......................... G16H 50/70 |

OTHER PUBLICATIONS

Jeurissen et al., "Diffusion MRI fiber tractography of the brain," NMR in Biomedicine, Apr. 2019, 32(4):e3785.

* cited by examiner

*Primary Examiner* — Antonio A Caschera
(74) *Attorney, Agent, or Firm* — Fish & Richardson P.C.

(57) ABSTRACT

Methods, systems, and apparatus for brain tractography by shading fiber bundles. In one aspect, a method includes forwarding patient brain data for presentation to a user; receiving, from the user, a selection of a brain parcel in response to presentation of the patient brain data; forwarding, for display to the user, tract health data comprising i) tract data for tracts connected to the brain parcel and ii) at least one metric for the tracts, the metric reflecting the health of the tracts; and taking an action in response to forwarding the tract health data.

17 Claims, 10 Drawing Sheets

BRAIN TRACTOGRAPHY BY SHADING FIBER BUNDLES

CROSS-REFERENCE TO RELATED APPLICATIONS

This application claims the benefit under 35 U.S.C. § 119(e) of the filing date of U.S. Application No. 63/408,374 for "Brain Tractography by Shading Fiber Bundles" filed on Sep. 20, 2022, the contents of which are hereby incorporated by reference in its entirety.

TECHNICAL FIELD

The subject matter described herein generally relates to displaying information about the brain using an interactive brain navigation system and interface.

BACKGROUND

Medical imaging includes techniques and processes for creating visual representations of an interior of a body for clinical analysis and medical intervention, as well as visual representation of physiology of some organs or tissues. Medical imaging can reveal internal structures hidden by skin and bones, and can be used to diagnose and treat various diseases.

Medical imaging also can establish a database of normal anatomy and physiology to make it possible to identify abnormalities amongst cohorts. Some medical imaging can also provide insights into functional activity and structural connections of a brain.

Diffusion-weighted magnetic resonance imaging uses the diffusion of water molecules to generate contrast in MR images. This allows the mapping of the diffusion process of molecules, e.g., water, in biological tissues, in vivo and non-invasively. Data collected by diffusion-weighted magnetic resonance imaging can be used to visually represent nerve tracts as part of a 3D modelling technique called tractography.

SUMMARY

This document describes technologies for processing medical images of a brain and displaying the processed images in brain tractograms where bundles of related nerve fibers, e.g., nerve fibers connected to a specific brain parcel, are shaded based on the health of the nerve fibers. The disclosed technology can be used by clinicians and other medical professionals to obtain insight about the health of structures and connections in a subject's brain (e.g., human or animal). Based on such insights, the clinicians and other medical professionals can perform improved and more informed diagnoses, treatments, operations, and/or research than with existing systems.

Throughout this specification, a "subject" can refer to, e.g., a human or an animal.

A "parcellation" in a brain refers to a region, e.g., a three-dimensional (3D) volumetric region, of the brain. Typically, a parcellation refers to a region that has a specified function, structural connectivity, or cellular composition. A collection of parcellations that collectively define a partition of the brain may be referred to as a "parcellation atlas." A parcellation atlas can include any appropriate number of parcellations, e.g., 50 parcellations, 100 parcellations, 500 parcellations, or 1000 parcellations. In one embodiment, a parcellation atlas can include 379 parcellations. Generally, a parcellation atlas can be chosen such that each parcellation in the parcellation atlas is expected to have broadly similar properties (e.g., functional activity, structural connectivity, or cellular composition) between subjects, even if the boundaries of the parcellation differ between subjects. The boundaries of parcellations may differ between subjects because of structural differences between the brains of subjects. In particular, the boundaries of parcellations in the brain of a subject can depend on the size of the brain, the shape of the brain, the presence of abnormalities (e.g., tumors) in the brain (e.g., that have the effect of distorting and displacing the remaining normal brain tissue), and on whether portions of the brain have been resected (e.g., surgically removed).

A "tract" or "nerve tract" in a brain can refer to one or more axons (nerve fibers) in the brain, e.g., in the white matter of the brain. A tract in a brain can be visually represented, e.g., as a line or tube that traces a path through a 3D model representing the brain. A tract can be represented in numerical format, e.g., by a collection of 3D numerical coordinates (e.g., x-y-z Cartesian coordinates expressed in a frame of reference of the brain) that are each positioned at a respective location on the tract.

A "network" in a brain can refer to a bundle (group) of multiple tracts that collectively form a structure and/or a functional network in the brain. For example, a network can include a bundle of tracts that link a set of regions in the brain, e.g., regions associated with respective functions, e.g., perceptual functions and memory functions. Examples of possible networks include a corticospinal network, a superior longitudinal fasciculus network, a cingulum network, an inferior fronto-occipital fascicle network, a frontal aslant tract network, a uncinated fasciculus network, an inferior longitudinal fasciculus network, a middle longitudinal fascicle network, a vertical occipital fasciculus network, and an optic radiations network.

In general, one innovative aspect of the subject matter described in this specification can be implemented in a method that includes forwarding, to a user device, patient brain data for presentation to a user; receiving, from the user device, a selection of a brain parcel in response to presentation of the patient brain data; forwarding, for display by the user device, tract health data comprising i) tract data for tracts connected to the brain parcel and ii) at least one metric for the tracts, the metric reflecting the health of the tracts; and taking an action in response to forwarding the tract health data.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the at least one metric represents a deviation of the health of the tracts from a healthy control sample of tracts.

In some implementations the tracts connected to the brain parcel are displayed by the user device with a gradation of color that represents the deviation of the health of the tracts from a healthy control sample of tracts.

In some implementations the metric comprises a Z-score.

In some implementations the tracts comprise multiple segments and wherein forwarding tract health data comprising the at least one metric for the tracts comprises forwarding tract health data comprising the at least one metric for each segment of the tract.

In some implementations only segments with respective metric values that are outside of a predetermined acceptable range are colored in the display.

In some implementations the method further comprises receiving, from the user device, a selection of the at least one metric.

In some implementations the display shows the selected brain parcel.

In some implementations the method further comprises receiving, from the user device, a selection of multiple brain parcels, wherein the multiple brain parcels are related to a brain network, wherein the tract health data forwarded for display to the user comprises tract health data for tracts connected to the multiple brain parcels.

In some implementations the display shows cortical areas of the brain related to the brain network.

In some implementations the at least one metric comprises a metric that represents a measures of white matter health or integrity.

In some implementations the metric comprises fractional anisotropy, mean diffusivity, or bundle thickness.

In some implementations the method further comprises receiving, from the user device, selection of a tumor, wherein in response to receiving the selection of the tumor the display shows the tumor.

In some implementations the method further comprises, in response to receiving the user selection of the brain parcel: identifying the tracts connected to the selected brain parcel; and for each tract connected to the selected brain parcel: dividing the tract into a plurality of segments; and providing, for display by the user device, tract health data for the at least one metric for each segment of the tract.

In some implementations forwarding, to the user device, patient brain data for presentation to the user comprises forwarding, for display by the user device, data that represents a three dimensional image of a brain, wherein the three dimensional image of the brain shows multiple tracts.

In some implementations taking an action in response to forwarding the tract health data comprises initiating a clinical or therapeutic treatment.

The subject matter described in this specification can be implemented in particular embodiments to realize one or more of the following advantages.

The visualization of magnetic resonance diffusion tractography as tracts is a useful way of displaying white matter pathways in the brain. However, little can be interpreted from these visualizations aside from the presence and directionality of the tracts. The presently described techniques address these downsides. Instead of using colors to display tracts and tract directions, systems implementing the presently described techniques present tracts with indicia that reflect critical information about the tracts, e.g., tract health. Accordingly, the visualization of magnetic resonance diffusion tractography is easier to interpret and more informative, which can be critical in the medical field to inform clinicians treatment decisions. In addition, the visualization can be used to support medical diagnoses, prognoses, treatment decision making, or a discussion/explanation of symptoms with a patient and/or their family.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in various drawings indicate like elements.

DETAILED DESCRIPTION

This document generally relates to providing interactive GUIs for users, such as medical professionals, to obtain insight about the health of a particular brain. Using the GUIs, for example, a medical professional can more accurately tailor diagnosis, treatment, and/or procedures for a particular patient and their particular condition. Using the disclosed technology, imaging data of a brain can, for example, be overlaid on a glass brain (e.g., a 3-dimensional (3D) representation of a brain). This modelled version of the brain can be outputted in a GUI or other user interface display at a user device. Although this disclosure is described from a perspective of a medical professional, the disclosed technologies can be used by any other type of user.

The medical professional can interact with the modelled version of the brain in order to analyze the particular patient's brain health and to make more informed decisions about how to address the particular patient's brain condition. For example, the medical professional can select a brain parcel and a health metric of interest, e.g., based on a the patient's medical history or current condition. In response, the modelled version of the brain that is output in the GUI or other user interface display can display tracts connected to the selected brain parcel. The tracts can be annotated with an indicia, e.g., colored with a gradation of color, that represents a deviation of the health of the displayed tracts from a healthy control sample of tracts (as measured by the selected metric). The medical professional can adjust or switch between different views of the patient's brain. For example, the medical professional can rotate the glass brain and zoom in on particular sections of interest.

Figure 1:
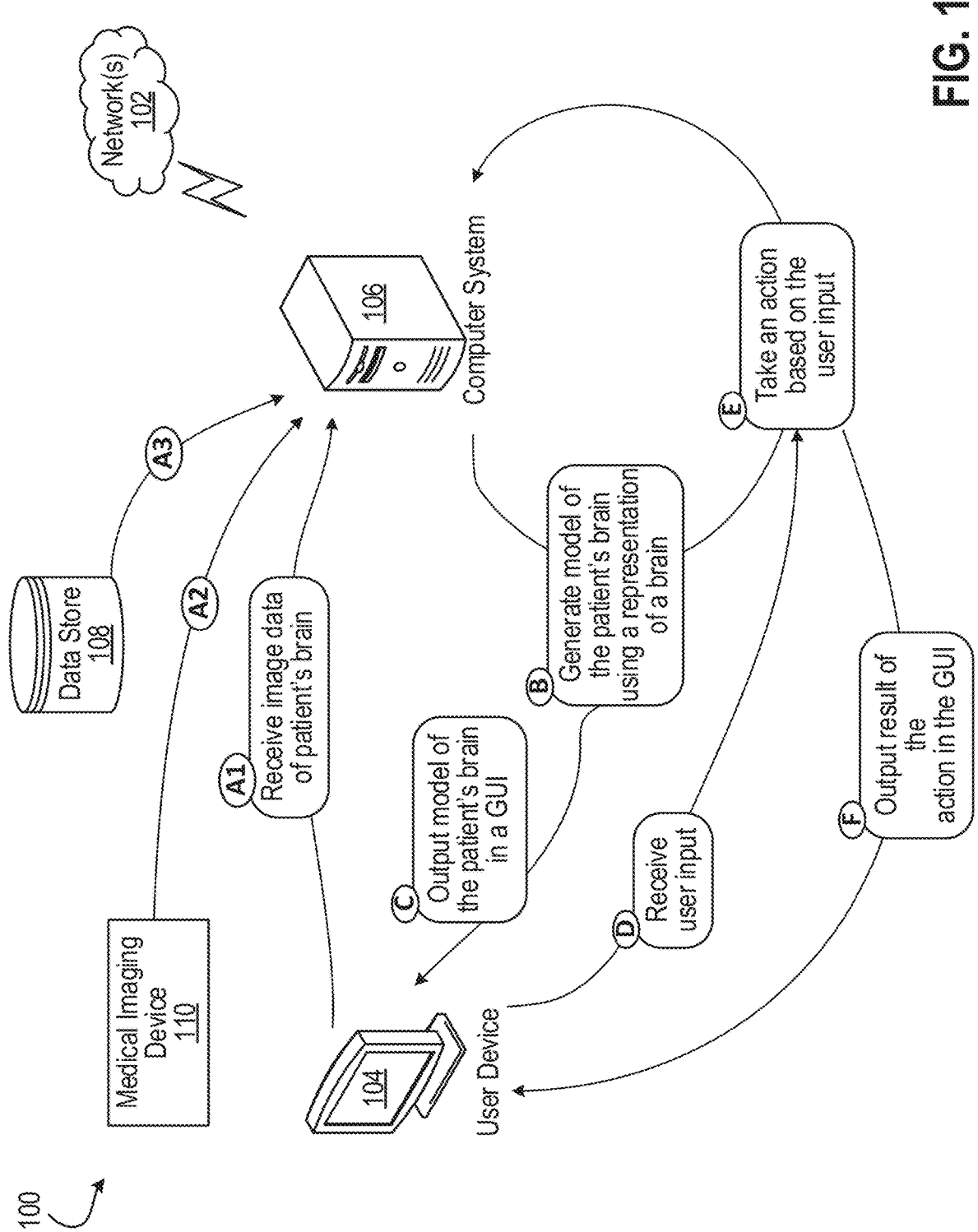
FIG. 1 is a conceptual diagram illustrating a computing environment for generating a GUI representation of a brain tractogram with shaded fiber bundles.

Referring to the figures, FIG. 1 is a conceptual diagram illustrating a computing environment 100 for generating a GUI representation of a brain tractogram with shaded fiber bundles. The computing environment 100 can include a user device 104, a computer system 106, a data store 108, and a medical imaging device 110, which can communicate (e.g., wired and/or wirelessly) via network(s) 102.

The user device 104 can be used by a medical professional, such as a clinician, surgeon, doctor, nurse, researcher, or other professional. The user device 104 and technologies described herein can be used by any other user. The user device 104 can be any one of a computer, laptop, tablet, mobile device, mobile phone, and/or smartphone. Sometimes, the user device 104 can be integrated into or otherwise part of one or more other devices in a medical setting, such as the medical imaging device 110 and/or the computer system 106.

The medical professional can use the user device 104 to view information about a patient's brain. For example, using the disclosed technology, the medical professional can view, at the user device 104, 3D representations of a particular patient's brain and make determinations about what diagnosis, treatment, and/or surgical procedures to perform. The medical professional can also view other/additional information about the particular patient at the user device 104 to make more informed decisions with regards to the particular patient's diagnosis, treatment, surgery, or other medical or research purposes. Thus, the user device 104 can provide hardware that can support the GUIs, software, and applications described herein, such as a singular and interactive brain navigation system that makes it easier and more intuitive for the medical professionals to make medical and research determinations.

The computer system 106 can be a remote computing system, a cloud-based system or service, and/or integrated with or otherwise part of one or more devices in a medical setting (e.g., such as the user device 104 and/or the medical imaging device 110). The computer system 106 can be a computer, processor, a network of computers, a server, and/or a network of servers. Sometimes, each medical setting (e.g. a hospital) can have one or more computer systems 106. Sometimes, the computer system 106 can be used across multiple medical settings (e.g., multiple hospitals). The computer system 106 can be configured to generate interactive representations of patients' brains using image data of the brains. The computer system 106 can also generate GUIs to display the interactive representations of the brains at the user device 104.

Sometimes, the computer system 106 can clean the image data by removing personally identifying information (e.g., protected health information (PHI)) from that data. Cleaning the image data can be beneficial to preserve patient privacy, especially if the interactive representations of patients' brains are used for medical research, clinical studies, or otherwise are stored in the data store 108 for future retrieval and use. Removing personally identifying information can also be advantageous if the computer system 106 is remote from the user device 104 and the interactive representations of the brain are generated at the computer system 106 that is outside a secure hospital infrastructure or other network where the image data may be generated and/or the interactive representations of the brain may be outputted. In other words, removing personally identifying information can be advantageous to preserve patient privacy when patient data is communicated between different networks and/or infrastructure.

The data store 108 can be a remote data store, cloud-based, or integrated into or otherwise part of one or more other components in the medical setting (e.g., such as the user device 104 and/or the computer system 106). The data store 108 can store different types of information, including but not limited to image data of patient brains (e.g., from the medical imaging device 110), cleaned image data (e.g., from the computer system 106), 3D representations of patient brains or other interactive representations of patient brains (e.g., from the computer system 106), connectivity data associated with patient brains, determinations, actions, or other user input taken by the medical professional (e.g., at the user device 104), patient information or records, or other relevant information that can be used in a medical setting. The data store 108 can also store values of metrics that reflect the health of patient brains (e.g., computed by the computer system 106 using image data of the patient brains). Example metrics include measures of white matter health or integrity (e.g., fractional anisotropy, mean diffusivity, or bundle thickness).

The medical imaging device 110 can be any type of device and/or system that is used in the medical setting to capture image data of patient brains. The medical imaging device 110 can capture image data that includes but is not limited to x-rays, computed tomography (CT) scans, magnetic resonance imaging (MRIs), diffusion-weighted magnetic resonance imaging, and/or ultrasound. One or more other types of image data can also be captured by the medical imaging device 110. The computer system 106 can be configured to receive any type of image data of a patient's brain and glean connectivity data about the brain and values of metrics that reflect the health of the brain from that image data. This data can then be mapped onto a user-friendly interactive representation of a brain.

In some implementations the image data received by the computer system can include image data from a person in a healthy control group. In these implementations the computer system 106 can glean connectivity data about the brain and values of metrics that reflect the health of the brain from that image data. Such data and values of metrics can be used to compare patient's brains (e.g., the health and integrity of the patient's white matter) to healthy brains. For example, the computing system 106 can compute Z-scores that represent deviations of values of metrics for a patient brain from values of the metrics for a healthy control group brain.

Still referring to FIG. 1, the computer system 106 can receive image data of a patient's brain from one or more of the user device 104 (step A1), the medical imaging device 110 (step A2), and the data store 108 (step A3). Sometimes, for example, when the user device 104 is part of the medical imaging device 110, the computer system can receive the image data captured by the medical imaging device 110 from only one device (e.g., the medical imaging device 110 or the user device 104). The image data can be captured by the medical imaging device 110 then sent directly, in real-time, to the computer system 106 (step A2) for real-time processing. Sometimes, the image data can be captured by the medical imaging device 110, then initially reviewed by the medical professional at the user device 104. Accordingly, the user device 104 can transmit the image data to the computer system 106 (step A1).

In some implementations, image data can be captured of multiple different brains by multiple different medical imaging devices 110. The image data can be stored in the data store 108 for future processing and analysis. The computer system 106 can then retrieve a batch or batches of the image data from the data store 108 (step A3) and process the image data in batch. Processing in batch can be advantageous to use fewer computational resources and reduce network bandwidth.

Once the computer system 106 receives the image data (steps A1-A3), the computer system can generate a model of the brain using a representation of a brain (step B). For example, the computer system 106 can map or model the patient's brain from the image data onto a 3D representation of a brain. The 3D representation can be a generic brain in three-dimensional or other multi-dimensional space. The 3D representation can be a glass brain. Mapping the patient's brain onto the glass brain can be advantageous to provide vantage points of different structures, parcellations, and connectivity in the particular patient's brain. A medical professional can more easily analyze the particular patient's brain via the 3D representation of the brain rather than through the raw image data captured by the medical imaging device 110. As a result, the medical professional can generate more informed decisions and determinations with regards to the particular patient's diagnosis, treatment, surgery, condition, or other medical or research purposes.

Once the patient's brain is modeled using the representation of the brain (step B), the computer system 106 can output the model of the patient's brain in a GUI at the user device 104 (step C). For example, the computer system 106 can generate the GUI that displays the model of the patient's brain, then transmit the GUI to the user device 104 to be outputted. The model can represent the patient's brain overlaid on the glass brain. Sometimes, instead of outputting the model at the user device 104 (step C), the computer system 106 can store the model of the patient's brain in the data store 108. The model of the patient's brain can then be accessed/retrieved at a later time and presented to the medical professional or other user at the user device 104.

As mentioned throughout, when the model of the patient's brain is outputted at the user device 104, the GUI can allow the medical professional to take numerous actions in response to reviewing the model of the patient's brain. For example, the medical professional can determine what type of diagnosis, treatment, or surgical procedures to take with regards to this particular patient. The medical professional can also interact with the model of the patient's brain through use-selectable options and features in the GUI that is outputted at the user device 104. The medical professional can change views of the model of the patient's brain (e.g., rotate around the model, view only a left or right side of the patient's brain, etc.), select portions of the patient's brain from the model (e.g., select a particular lobe, node, parcellation, etc.), and view other information about the patient (e.g., health records, prior medical visits, etc.). The medical professional can provide input to the user device 104, for example, via an input device, and the input can indicate the medical professional's interaction(s) with the model of the patient's brain. This input can then be received and stored by the computer system 106 (step D).

The computer system 106 can take an action based on the received user input (step E). For example, if the medical professional changes or selects a different view of the model of the patient's brain, then the computer system 106 can generate an updated GUI display of the patient's brain that only includes the selected view. As another example, if the medical professional selects a particular brain parcel, then the computer system 106 can generate an updated GUI display of the patient's brain that highlights the selected brain parcel and displays only tracts that are connected to the selected brain parcel. In this example, if the medical professional selects a particular metric, then the computer system can display the tracts that are connected to the selected brain parcel together with values of the metric for the tracts. For example, the computer system 106 can generate an updated GUI display of the patient's brain that highlights the selected brain parcel and displays only tracts that are connected to the selected brain parcel, where the tracts are annotated with an indicia, e.g., colored with a gradation of color, that represents a deviation of the health of the tracts from a healthy control sample of tracts. Alternatively, greyscale or other indicia can be used to indicate the deviation. Any of the above updated GUI display data can be displayed at the user device (step F). Generating GUI display data, updating GUI display data, and example GUI displays are described in more detail below with reference to FIGS. 3-8.

A medical professional can review the outputted results and take further actions in response. Further actions can include decisions about how to proceed with diagnosis, treatment, and/or a subsequent medical procedure. In some implementations, the computer system 106 can take an action based on the user input (step E) that does not also include outputting a result of the action at the user device 104 (step F). For example, the medical professional can input notes about what actions the medical professional intends to take during a medical procedure, a diagnosis for the particular patient, and/or treatment for the patient. The computer system 106 can receive this input and store it in the data store 108 but may not output results from storing this input. This input can then be retrieved from the data store 108 and provided to one or more other devices (e.g., a report can be generated that indicates the patient's diagnosis and treatment). The report can then be provided to a device of the patient. The report can also be transmitted to devices of other medical professionals, such as those in a hospital infrastructure/network). The computer system 106 can take one or more other actions based on the user input (step E) and optionally output results of the action(s) at the user device 104 (step F).

Figure 2:
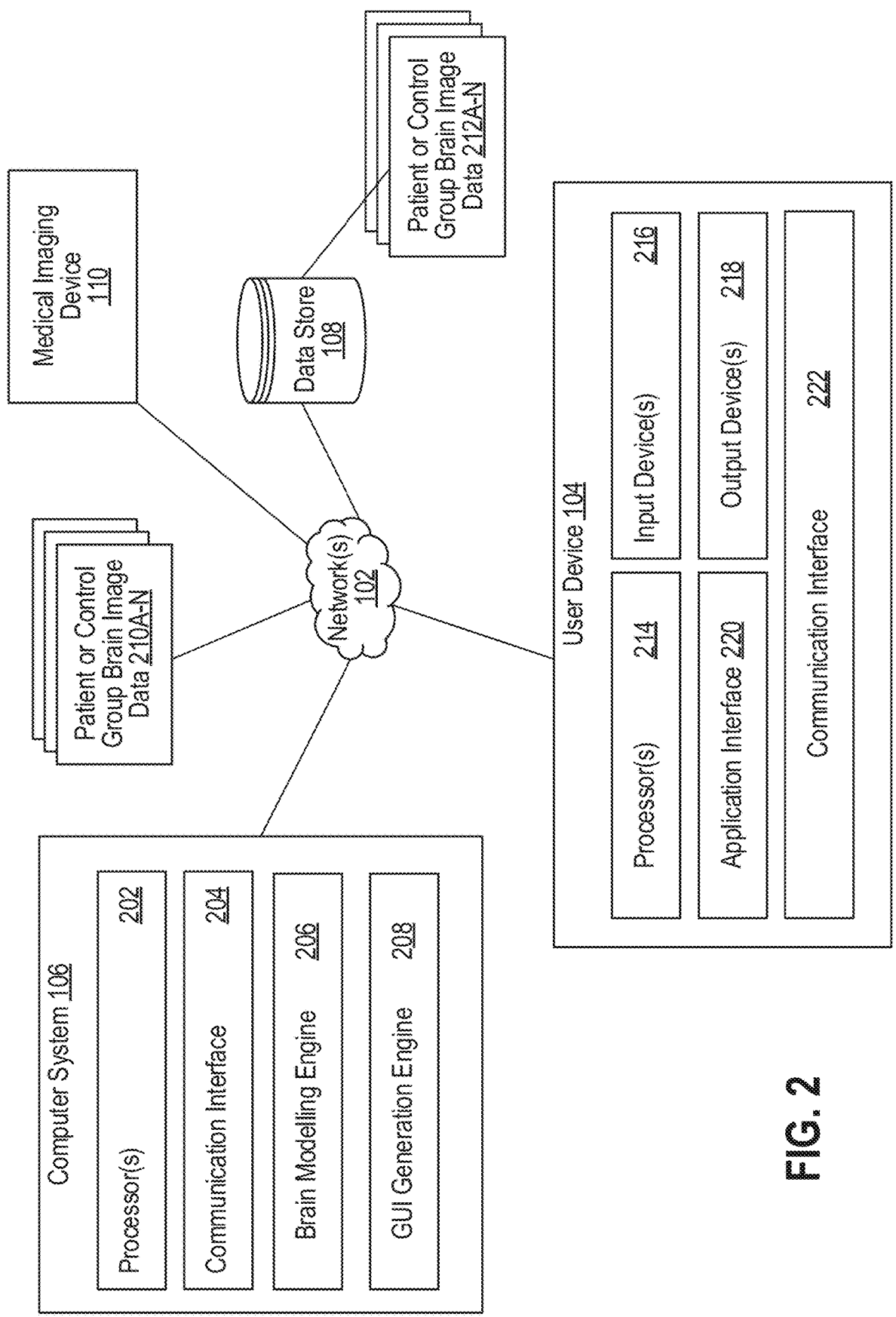
FIG. 2 shows an example system for processing images, e.g., medical images, of brains.

FIG. 2 illustrates components in a computing landscape that can be used to generate the presently described GUI representations of a brain tractogram with shaded fiber bundles. As described above, the user device 104, computer system 106, data store 108, and medical imaging device 110 can communicate via the network(s) 102. One or more of the components 104, 106, 108, and 110 can also be integrated into a same computing system, network of devices, server, cloud-based service, etc. The network(s) 102 may be a wide-area network (WAN), such as the Internet, a cellular telecommunications network, or a private WAN. Connection via the network(s) 102 can include a traditional dial-up modem, a high-capacity (e.g., cable) connection such as a broadband modem, and/or a wireless modem.

The computer system 106 can include processor(s) 202, communication interface 204, brain modelling engine 206, and GUI generation engine 208. The processor(s) 202 can be configured to perform one or more operations described herein. Although not depicted, the computer system 106 can also include at least one memory unit, which may have semiconductor random access memory (RAM) and semiconductor read only memory (ROM).

One or more of the techniques and processes described herein can be implemented as software application programs executable by the processor(s) 202 in the computer system 106. Moreover, one or more of the techniques and processes described herein can be executed in browsers at remote terminals, systems, or devices (e.g., the user device 104 and/or another computer system), thereby enabling a user of the remote terminals, systems, or devices to access the software application programs that are executing on the computer system 106. For example, steps for any of the techniques and processes described herein can be effected by instructions in the software application programs that are carried out within the computer system 106. Software instructions may be formed as one or more code modules (e.g., using PYTHON or equivalent language modules installed on the computer system 106 and/or the remote terminals, systems, or devices), each for performing one or more particular tasks. The software instructions can also be divided into separate parts. For example, a first part and the corresponding code module(s) can perform the techniques and processes described herein and a second part and the corresponding code module(s) can manage a user interface (e.g., the GUIs described herein) between the first part and the medical professional at the user device 104.

Moreover, the software may be stored in a non-transitory, tangible, computer readable medium, including storage devices described throughout this disclosure. The software can be loaded into the computer system 106 from the computer readable medium, and then executed by the computer system 106. A computer readable medium having such software or computer program recorded on the computer readable medium can be a computer program product. Examples of transitory or non-tangible computer readable transmission media that may also participate in the provision of software, application programs, instructions and/or data include radio or infra-red transmission channels as well as a network connection to another computer or networked device, and the Internet or Intranets, including e-mail transmissions and information recorded on Websites and the like.

Still referring to the computer system 106, the brain modelling engine 206 can be configured to map a patient's (or a member of a healthy control group's) brain onto a representation of a brain (e.g., refer to step B in FIG. 1). For example, the brain modelling engine 206 can receive patient or control group brain image data 210A-N, which can be used to generate a model of the brain. The patient or control group brain image data 210A-N can be received from the medical imaging device 110. The patient or control group brain image data 210A-N can also be received from the user device 104. In some implementations, as described in reference to FIG. 1, the computer system 106 can retrieve patient or control group brain image data 212A-N from the data store 108. The patient or control group brain image data 212A-N can then be used by the brain modelling engine 206 to model the patient's (or member of the healthy control group's) brain.

In some implementations, modelling the brain can include identifying connectivity data for the particular brain. Modelling the brain can then include mapping the connectivity data over the representation of a generic brain. In yet some implementations, modelling the patient's brain can include identifying hubs, parcellations, deep nodes, lateral nodes, and other portions of the patient's brain that can be mapped onto the representation of the generic brain. Moreover, the brain modelling engine 206 can be configured to identify personally identifying information in the image data of the brain and extract that information before mapping the patient's brain onto the representation of the generic brain. The brain modelling engine 206 can use one or more machine learning models to accurately map the particular patient's brain data onto a representation of the generic brain.

In some implementations, for example, Digital Imaging and Communications in Medicine (DICOM) images of a particular brain to be parcellated can be processed by the brain modelling engine 206. DICOM is an international standard for transmitting, storing, retrieving, processing and/or displaying medical imaging information. A registration function for the particular brain can be determined in a Montreal Neurological Institute (MNI) space (a common coordinate space) described by a set of standard brain data image sets, a registered atlas from a human connectome project can be determined, and diffusion tractography of the DICOM images can be performed to determine a set of whole brain tractography images of the particular brain (in neuroscience, tractography can be thought of as a 3D modelling technique used to represent white matter tracts visually). For each voxel in a particular parcellation in the registered atlas, voxel level tractography vectors showing connectivity of the voxel with voxels in other parcellations can be determined, the voxel can be classified based on the probability of the voxel being part of the particular parcellation, and determining of the voxel level tractography vectors and the classifying of the voxels for all parcellations of the HCP-MMP1 Atlas can be repeated to form a personalised brain atlas (PBs Atlas) containing an adjusted parcellation scheme reflecting the particular brain. Example brain modelling engines are described in U.S. application Ser. No. 17/066,171, filed Oct. 8, 2020, and U.S. application Ser. No. 17/066,178, filed Oct. 8, 2020, the contents of which are incorporated by reference in its entirety.

The GUI generation engine 208 can be configured to generate GUI displays of the modelled brain. The GUI generation engine 208 can receive the modelled brain from the brain modelling engine 206 and generate an appropriate GUI for displaying the modelled brain to the medical professional. The GUI generation engine 208 can also transmit the generated GUI(s) to the user device 104 to be outputted/presented to the medical professional.

Moreover, whenever user input is received from the user device 104 that includes performing some action in response to the outputted model of the brain, the input can be received by the computer system 106. The brain modelling engine 206 can take some action (e.g., refer to step E in FIG. 1) in response to receiving the user input (e.g., refer to step D in FIG. 1). That action can include, for example, identifying a brain parcel corresponding to a region of the modelled brain that the user has selected, identifying tracts that are connected to the brain parcel, and retrieving data representing values of metrics that reflect the health of the tracts that are connected to the brain parcel. The GUI generation engine 208 can generate updated GUI displays based on the actions taken by the brain modelling engine 206 (e.g., refer to step F in FIG. 1). The GUI generation engine 208 can then transmit the updated GUI displays to the user device 104 to be outputted to the medical professional.

In some implementations, the metrics that reflect the health of the tracts that are connected to the brain parcel can be calculated from diffusion-weighted imaging (DWI) images. For example the computer system 106 can be configured to pre-process DWI images, e.g., perform motion detection/correction or dropping of directions, gradient distortion correction, etc.

The computer system 106 can then use the pre-processed DWI images to calculate a diffusion tensor map. The computer system 106 can calculate the metrics from the diffusion tensor map, since the metrics can be viewed as scalars representing respective characterizations of the tensors in the tensor map, e.g., fractional anisotropy, mean diffusivity, etc.

The computer system 106 can overlay a tractography atlas, e.g., a template tractography atlas or a specific patient's real tractography, and for each set of tracts connecting to each brain parcel, the computer system can calculate a metric within the set of tracts as an average (or more generally any measure of central tendency or spread; median, standard deviation, etc.) along various segments of the tracts, e.g., 100 segments. In some implementations the computer system 106 can store the tractography atlas and metrics in a database for subsequent retrieval. In some implementations the calculated and stored data can include 379 data points (one per brain parcel) multiplied by the number of possible pairwise combinations ((379×378)/2), as well as groups of combinations (379+379!/(2!377!)+379!/(3!376!)+ . . . etc.). In some cases, each of these values can be multiplied by the number of segments being displayed per connection (e.g. ×100). In response to receiving user selection of a metric of interest, data representing values of the selected metric of interest for specific tracts can be computed and/or loaded in a GUI for presentation for a user, e.g., within a time in the order of seconds.

In some implementations, one or more of the components of the computer system 106, such as the brain modelling engine 206 and the GUI generation engine 208 can be part of one or more different systems. For example, the brain modelling engine 206 can be part of a software application program that can be loaded and/or executed at another device, such as the user device 104 and/or the medical imaging device 106. As another example, the GUI generation engine 208 can be part of a software application program that is executed at the user device 104 and the brain modelling engine 206 can be executed at the computer system 106 or another remote computing system, server, or cloud-based server or system.

The user device 104 can include processor(s) 214, input device(s) 216, output device(s) 218, application interface 220, and communication interface 222. The processor(s) 214 can be configured to perform one or more operations described herein. Although not depicted, the user device 104 can also include at least one memory unit, which may have semiconductor random access memory (RAM) and semiconductor read only memory (ROM).

The input device(s) 216 and output device(s) 218 can include one or more of an audio-video interface that couples to a video display, speakers, and/or a microphone, keyboard, mouse, scanner, camera, touch screen display, other display screen(s) (e.g., LCDs), joystick, and/or other human interface device. The input device(s) 216 can be configured to receive user input from the medical professional or other user. The output device(s) 218 can be configured to output a model of the patient's brain and/or actions taken by the computer system 106 in response to the user input. The output device(s) 218 can present a variety of GUI displays and information to the medical professional, where such displays and information are generated by the computer system 106. The output device(s) 218 can also output information that is received or otherwise generated by the medical imaging device 110.

The application interface 220 can be executable software or another program that is deployed at the user device 104. The GUIs generated by the computer system 106 can be displayed or otherwise outputted via the application interface 220. In some implementations, the application interface 220 can be executed at a browser of the user device 104. The medical professional can then access and view the GUIs via the Internet or other connection. Sometimes, the application interface 220 can be executed as a software module/program/product at the user device 104. The application interface 220 can provide the interactive GUIs to the medical professional and receive input from the medical professional.

The communication interfaces 204 and 222 can be configured to provide communication between and amongst the components described herein. For example, a modem can be integrated therein.

Figure 3:
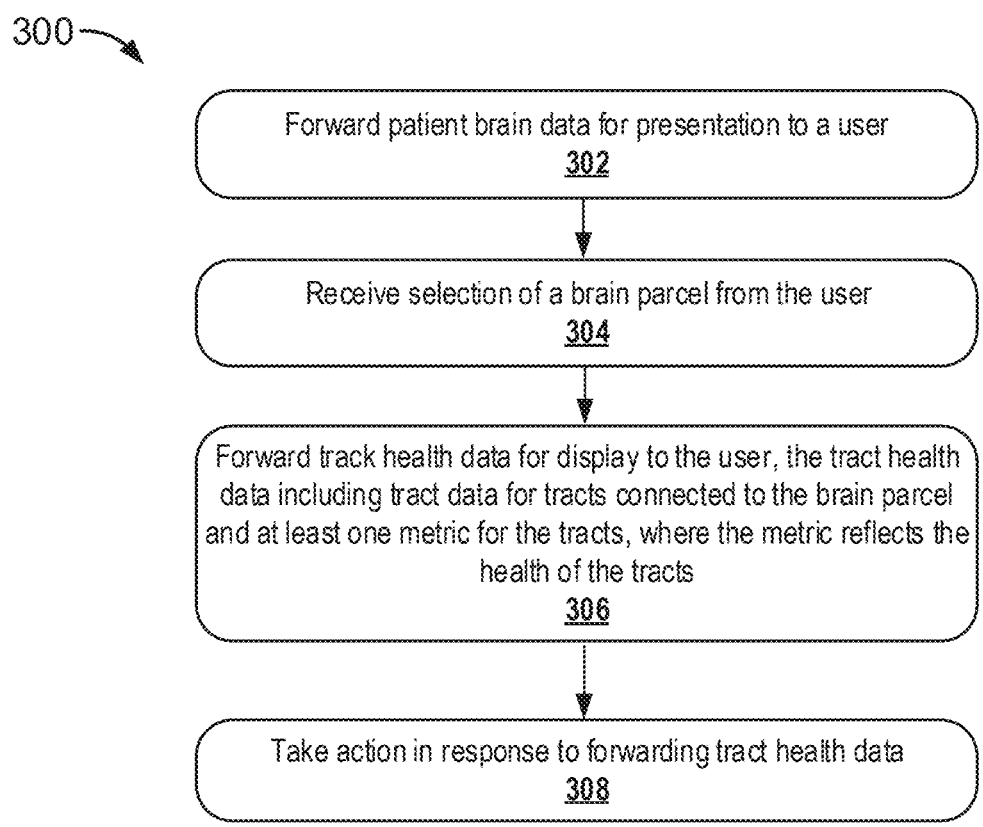
FIG. 3 is a flowchart of an example process for generating GUI presentations for brain tractography with shaded fiber bundles.

FIG. 3 is a flowchart of an example process 300 for presenting tractograms with shaded fiber bundles. For convenience, the process 300 will be described as being performed by a system of one or more computing devices located in one or more locations. For example, example system 200 of FIG. 2, appropriately programmed in accordance with this specification, can perform the process 300.

The system can forward, to a user device, patient brain data for presentation to a user (step 302). In some implementations the patient brain data can include data obtained through analysis of MR images of a patient's brain. For example, the patient brain data can include data indicating a size of the patient's brain, the shape of the patient's brain, the presence of abnormalities (e.g., tumors) in the brain (e.g., that have the effect of distorting and displacing the remaining normal brain tissue), and data indicating whether portions of the brain have been resected (e.g., surgically removed).

The patient brain data can be presented to a user in a GUI as a three dimensional image of the patient's brain. For example, the three dimensional image of the patient's brain can show brain tracts overlaid on a glass brain. The presentation can allow a user to adjust the opacity of the three dimensional image of the patient's brain, e.g., to adjust the visibility of the displayed tracts. The presentation can also allow a user to change views of the three dimensional image of the patient's brain, e.g., rotate around the three dimensional image, view only a left or right side of the patient's brain, etc. The presentation can also allow a user to select portions of the patient's brain from the three dimensional image, e.g., select a particular lobe, node, parcellation, etc. In some implementations the presentation can also display other information about the patient, e.g., health records, prior medical visits, etc.

In response to presentation of the patient brain data, the system receives a selection of a brain parcel from the user device (step 304). For example, the user can hover over the three dimensional image of the brain that is displayed in the GUI and select a particular region of the brain. Data representing this selection can be received from the user device. As another example, the presentation can include a list of selectable predefined brain parcels and the user can select a brain parcel from the list. The selected brain parcel can be a region of the brain that has a specified function, structural connectivity, or cellular composition. In some implementations the system can also receive a selection of a metric of interest, e.g., a metric that represents a measure of white matter health or integrity such as fractional anisotropy, mean diffusivity, or bundle thickness. For example, the presentation can include a list of selectable metrics and the user can select a metric from the list. Data representing this selection can be received from the user device.

In response to receiving the selection of the brain parcel from the user device, the system identifies tracts that are connected to the selected brain parcel, e.g., using the techniques described in U.S. application Ser. No. 17/066,171, filed Oct. 8, 2020, and U.S. application Ser. No. 17/066,178, filed Oct. 8, 2020, the contents of which are incorporated by reference in their entirety. In implementations where the system also receives selection of a metric of interest at step 304, the system can also compute or retrieve data representing values of the selected metric for the identified tracts (as described above with reference to FIG. 2). In implementations where the system does not receive selection of a metric of interest at step 304, the system can compute or retrieve data representing values of multiple metrics for the identified tracts. In either case, the values of the metrics can include values that represent deviations of the health of the identified tracts from a healthy control sample of tracts. For example, the values of the metrics can include Z-scores.

The system then forwards tract health data for display by the user device (step 306). The tract health data includes tract data for the tracts that are connected to the selected brain parcel and values of metrics for the tracts for display by the user device in the GUI presentation. In implementations where the system received user selection of a metric of interest at step 304, the GUI presentation can display the identified tracts and the values of the selected metric. In implementations where the system did not receive user selection of a metric of interest at step 304, the GUI presentation can display the identified tracts and values of a default metric of interest. Alternatively, the GUI presentation can display the identified tracts and a list of user selectable metrics. In response to the user selecting a metric from the list of metrics, the GUI presentation can display the identified tracts and the values of the selected metric.

To display values of a default or user selected metric, the system can generate a GUI presentation that displays the tracts that are connected to the brain parcel selected at step 304 with a gradation of an indicia, e.g., a color, that represents the deviation of the health of the tracts from a healthy control sample of tracts, e.g., where increasingly unhealthy tracts are indicated with an increasingly intense indicia, e.g., with an increasingly intense color such as red. In some implementations, only tracts with metric values that are outside of a predetermined acceptable range are colored in the display. For example, a user can select an option that filters the displayed tracts such that only critically unhealthy tracts are displayed and/or indicated. In some implementations the GUI presentation can display the brain parcel selected by the user at step 304, e.g., where the brain parcel is shaded in a color that is different to the color used to shade the tracts.

In some implementations, the GUI presentation can display the tracts that are connected to the brain parcel selected at step 304 in segments, where each segment of each tract corresponds to a respective matric value. For example, in response to receiving a selection of a brain parcel from the user device at step 304, the system can identify tracts that are connected to the selected brain parcel and, for each identified tract, divide the tract into multiple tracts. The system can then compute or retrieve data representing values of the metrics for each segment of the tract. The GUI presentation can then display segmented tracts with a gradation of color that represents the deviation of the health of the tract segments from a healthy control sample of tracts. An example GUI presentation that displays segmented tracts with a gradation of color that represents the deviation of the health of the tracts from a healthy control sample of tracts is described below with reference to FIG. 4.

In some implementations, the user can select multiple brain parcels at step 304. For example, the user can select multiple brain parcels that are related to a same brain network. In these implementations, at step 306, the system can forward data representing tracts that are connected to the multiple selected brain parcels and values of metrics for these tracts for display by the user device in the GUI presentation. In these implementations, the GUI presentation can also display cortical areas of the brain related to the brain network.

In implementations where the patient's brain includes a tumor, the GUI presentation displayed at step 306 can include an option that allows a user to select the tumor. In response to receiving user selection of the tumor, the system can update the three dimensional image of the patient's brain to display the tumor, e.g., where the tumor is shaded in a color that is different to the color used to shade the tracts and different to the color used to shade the brain parcel selected at step 304. In some implementations the number of parcels in the brain can lie in the range [1, 379]. In other implementations a more granular atlas can be used and the number of parcels can exceed 1000. In some implementations each parcel can have a size of at least ~1 mm$^3$.

The system takes an action in response to forwarding the tract health data (step 308). The action can include initiating a clinical or therapeutic treatment. For example, the medical professional can determine what type of diagnosis, treatment, or surgical procedures to take with regard to the particular patient.

Figure 4:
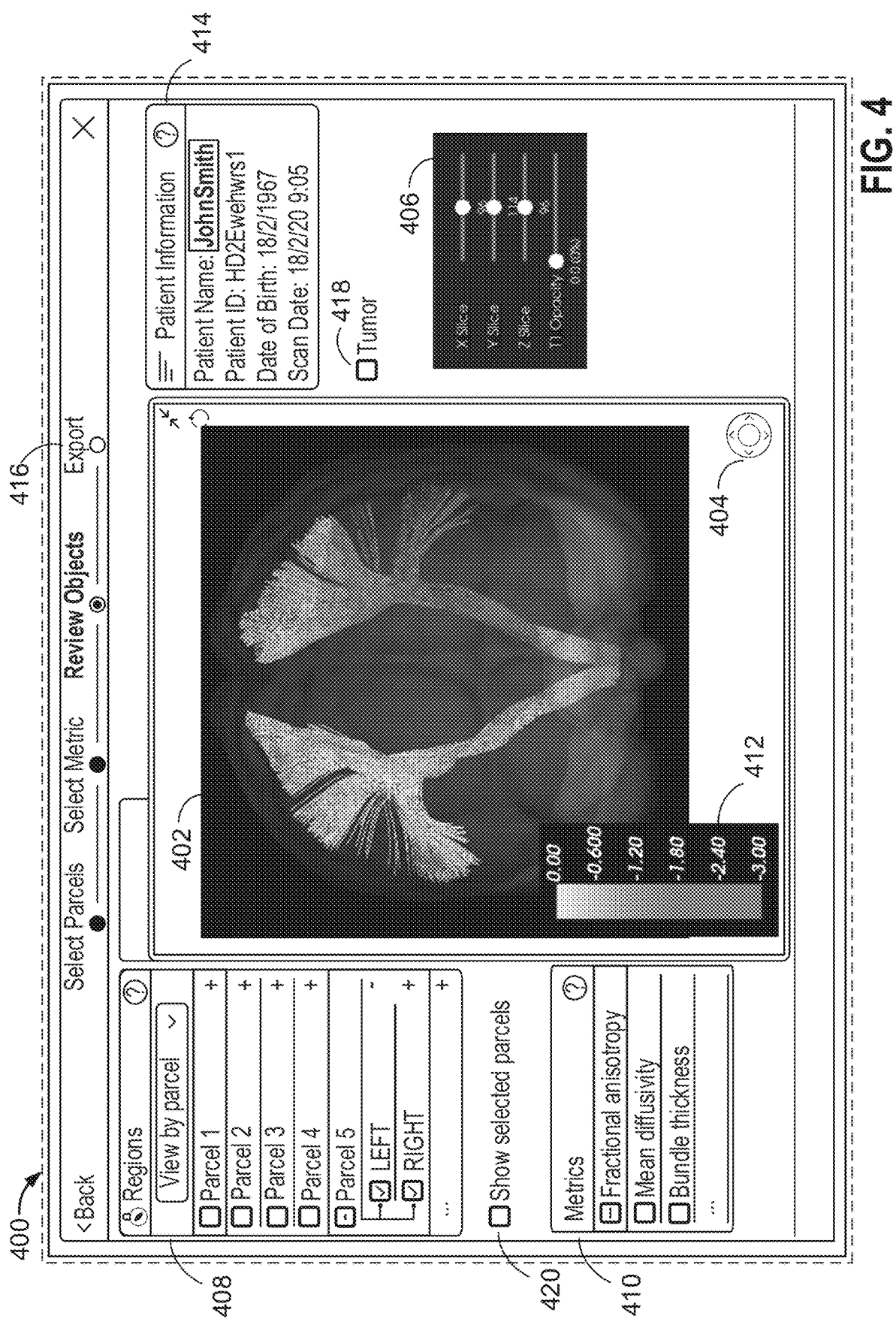
FIGS. 4 and 5 shows example GUI presentations for brain tractography with shaded fiber bundles.

FIG. 4 shows a first example GUI presentation 400 for brain tractography with shaded fiber bundles. In particular, GUI presentation 400 displays segmented tracts that are connected to a same brain parcel with a gradation of color that represents the deviation of the health of the tracts from a healthy control sample of tracts. The example GUI presentation 400 can be output at the user device 104 described herein, e.g., at step 306 of example process 300 described above.

Example GUI presentation 400 includes a three dimensional image 402 of a patient's brain. A user can change views of the three dimensional image 402, e.g., rotate the view, by clicking on the image and dragging the image, through the navigation button 404, or by directly adjusting image coordinates in the guide 406. As the view of the three dimensional image 402 changes, a guide 406 updates the image coordinates. The guide 406 also allows a user to adjust the opacity of the brain shown in the three dimensional image 402.

A user can select a brain parcel through the example GUI presentation 400 by directly clicking on a corresponding portion of the brain show in the three dimensional image 402 or by selecting a brain parcel from a list 408 of predefined brain parcels. In the example shown in FIG. 4, the user has selected two parcels, however in some implementations the user can select one parcel or more than two parcels.

A user can select a metric of interest through the example GUI presentation 400 by selecting a metric from a list 410 of predefined brain parcels. In the example shown in FIG. 4, the user has selected fractional anisotropy as the metric of interest.

The three dimensional image 402 displays tracts that are connected to the brain parcels selected in list 408. The tracts are segmented into multiple portions, where each portion is shaded according to a gradation of color that represents the deviation of the health of the displayed tracts from a healthy control sample of tracts (where Z scores are used to measure the deviation). The GUI presentation 400 includes a legend 412 that maps the gradation of color to the deviation. In this example, darker shaded tracts deviate more from healthy tracts compared to lighter shaded tracts. As shown, in this example the tracts connected to the selected right parcel are unhealthier than the tracts connected to the selected left parcel, where the health of the tracts is better at the origin and endpoint of the tracts and worse in the middle.

Example GUI presentation 400 also shows information 414 about the patient, e.g., patient name, patient ID, date of birth and the date at which the imaging used to collect brain data to display in the GUI presentation 400 was performed. The GUI presentation 400 also includes user selectable options 418 and 420 which, when selected, cause the three dimensional image 402 to show, e.g., color, a tumor present in the patient's brain or the selected parcels. In example GUI presentation 400, neither of these options have been selected.

A user, e.g., medical professional, can use the selectable options in the GUI presentation 400 to specify particular actions that the user would like to take with regards to the three dimensional image 402. For example, the user can also choose option 416 to export the image within an IT network of the hospital or other medical setting where the user works. The user can save the exported data (e.g., in the data store 108 in FIG. 1), which can be used in future research and analysis.

Figure 5:
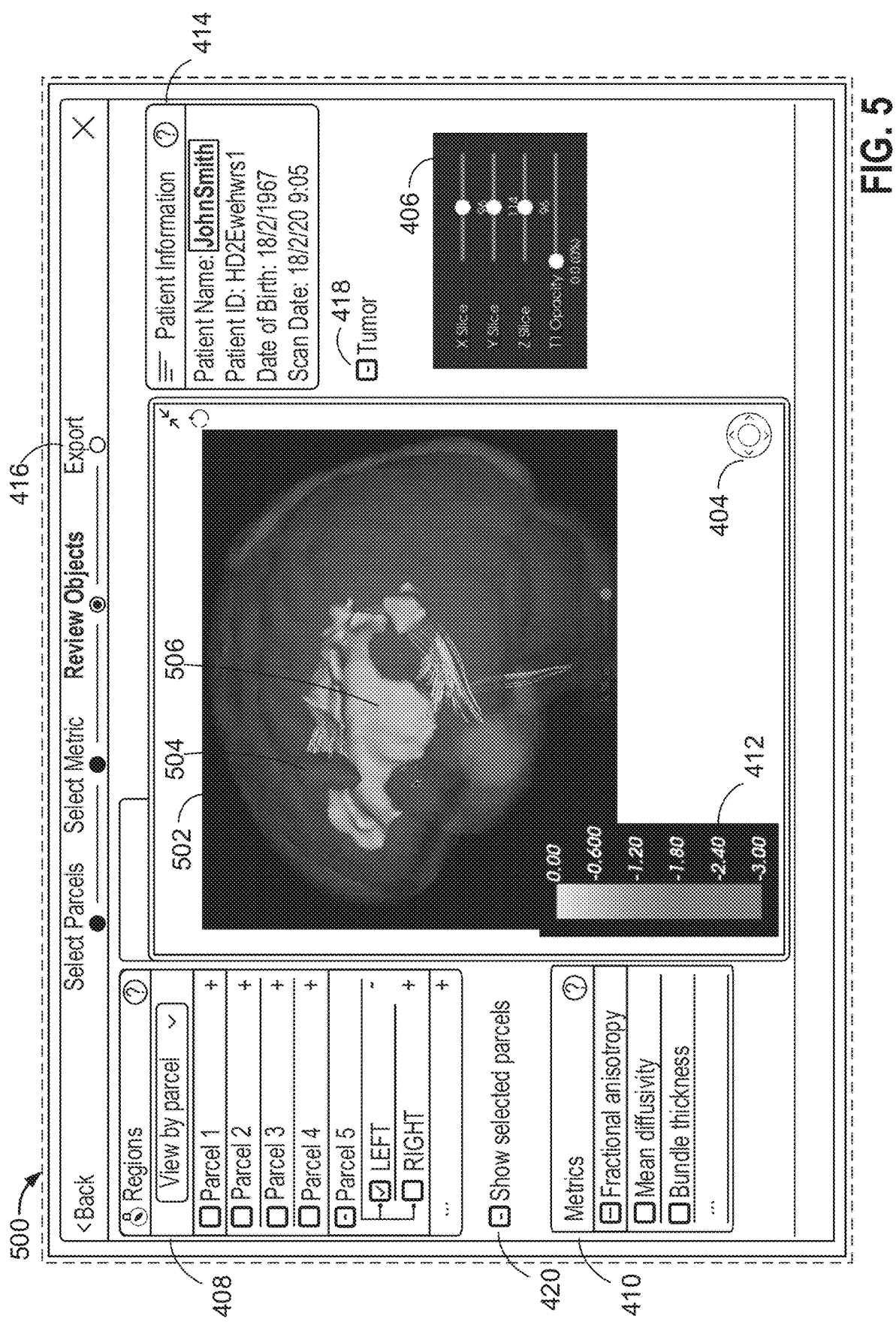

FIG. 5 shows a second example GUI presentation 500 for brain tractography with shaded fiber bundles. In particular, GUI presentation 500 displays segmented tracts that are connected to a brain parcel in a brain that has a tumor. The example GUI presentation 500 can be output at the user device 104 described herein, e.g., at step 306 of example process 300 described above.

Example GUI presentation 500 is similar to GUI presentation 400 described above with reference to FIG. 4 and includes a three dimensional image 502 of a patient's brain, where a user can change views of the three dimensional image 502 through the navigation button 404 or by directly adjusting image coordinates in the guide 406. As in GUI presentation 400, the guide 406 also allows a user to adjust the opacity of the brain shown in the three dimensional image 502.

Further, as in GUI presentation 400, a user can select a brain parcel by directly clicking on a corresponding portion of the brain show in the three dimensional image 502 or by selecting a brain parcel from a list 408 of predefined brain parcels. In the example shown in FIG. 5, the user has selected one parcels. In addition, in the example shown in FIG. 5, the user has selected option 420. Therefore, the three dimensional image 502 displays the selected brain parcel 504. In addition, the user has selected option 418. Therefore, the three dimensional image 502 displays a tumor 506 present in the patient's brain. For clarity and ease of interpretation, the selected brain parcel 504 and the tumor 506 are shaded in different colors in the three dimensional image 502 (the selected brain parcel 504 is shaded in a darker color than the tumor 506).

As in GUI presentation 400, a user can select a metric of interest through the example GUI presentation 500 by selecting a metric from a list 410 of predefined brain parcels. In the example shown in FIG. 4, the user has selected fractional anisotropy as the metric of interest.

The three dimensional image 502 displays tracts that are connected to the brain parcel 504. As in GUI presentation 500, the tracts are segmented into multiple portions, where each portion is shaded according to a gradation of color that represents the deviation of the health of the displayed tracts from a healthy control sample of tracts (where Z scores are used to measure the deviation). The GUI presentation 500 also includes a legend 412 that maps the gradation of color to the deviation. In some implementations, a user can toggle the options 418 and 420 on and off, e.g., to provide an unobstructed view of the segmented tracts.

Example GUI presentation 500 also shows information 414 about the patient, e.g., patient name, patient ID, date of birth and the date at which the imaging used to collect brain data to display in the GUI presentation 500 was performed.

A user, e.g., medical professional, can use the selectable options in the GUI presentation 500 to specify particular actions that the user would like to take with regards to the three dimensional image 502. For example, the user can also choose option 416 to export the image within an IT network of the hospital or other medical setting where the user works. The user can save the exported data (e.g., in the data store 108 in FIG. 1), which can be used in future research and analysis.

Figure 6A:
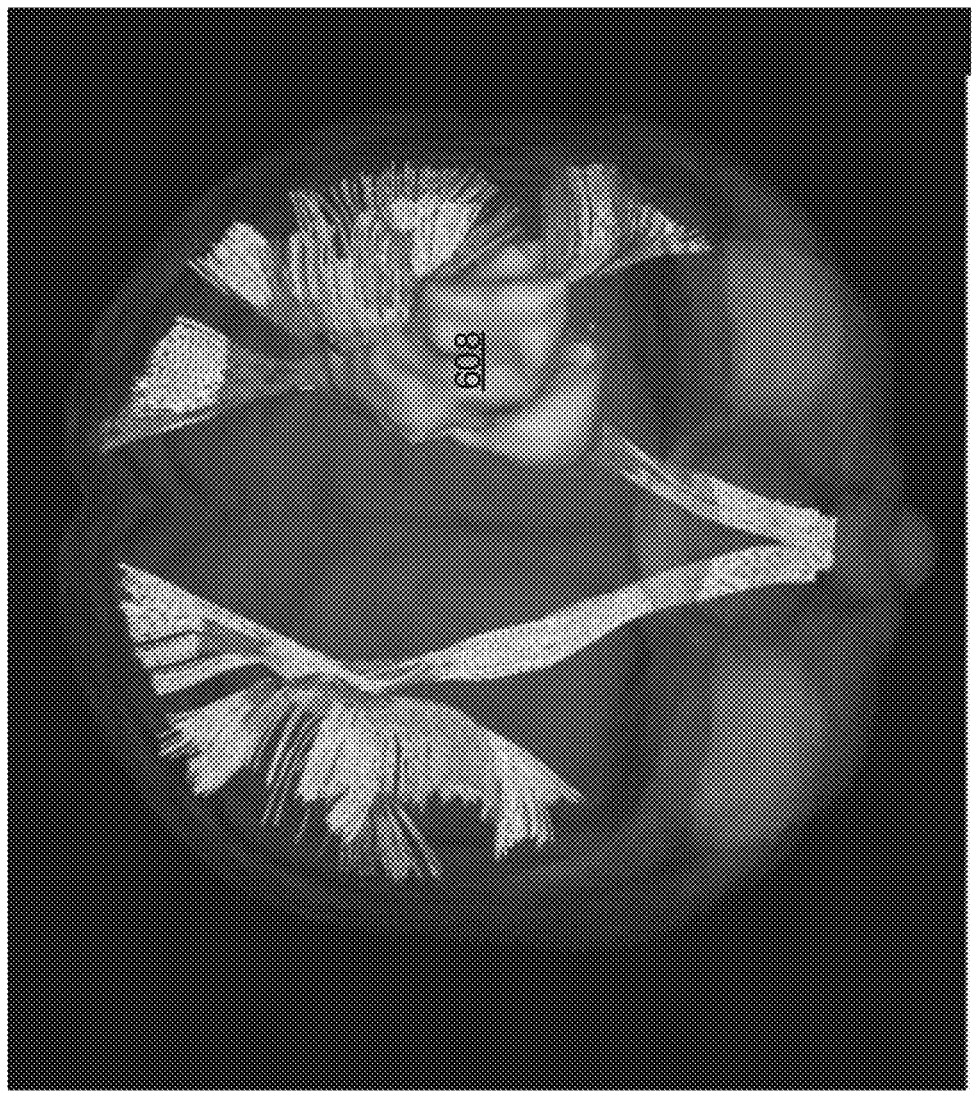
FIGS. 6A-D shows an example sequence of images of a same brain.

FIGS. 6A-D shows an example sequence of images of a same brain. The images in the example sequence can be included in GUI presentations output at the user device 104 described herein, e.g., the GUI presentations output at step 306 of example process 300 described above. FIG. 6A shows a first image 600 in the example sequence of images. In this image, tracts that are connected to a selected brain parcel are displayed, where the tracts are segmented and colored with a gradation of color that represents the deviation of the health of the tract segments from a healthy control sample of tracts. The first image 600 also shows a tumor 608 on the right hand side of the image.

Figure 6B:
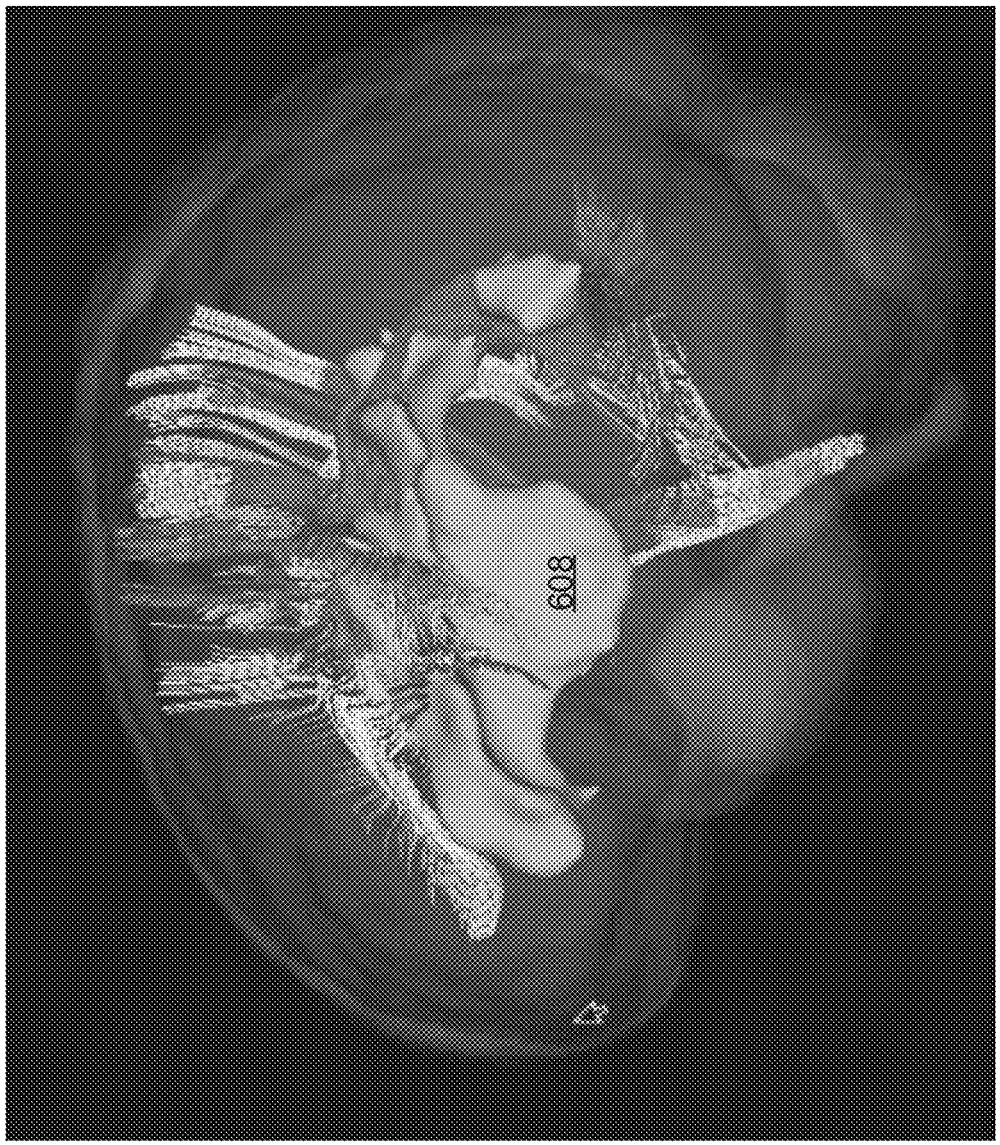

FIG. 6B shows a second image 602 in the sequence of images. The second image 602 shows a different view of the same brain, tracts, and tumor 608 shown in image 600 of FIG. 6A. In particular, the second image 602 corresponds to a rotation of the first image 600. For example, the user may have clicked on the brain shown in the image 600 and dragged the cursor to rotate the brain, e.g., approximately 90 degrees clockwise. As shown, this view can provide a user with a more detailed view of the tracts (and their health) that are connected to the selected parcel since the tracts are more visible from this angle. Generally, tracts nearer the tumor 608 are less healthy (which are displayed in a darker color) than tracts at the origin or endpoint (which are displayed in a lighter color).

Figure 6C:

FIG. 6C shows a third image 604 in the sequence of images. The third image 604 shows a different view of the same brain, tracts, and tumor 608 shown in image 602 of FIG. 6B. In particular, the third image 604 corresponds to a zoomed in portion of the second image 602. For example, the user may have clicked on the tumor 608 shown in the image 602 and scrolled to zoom in on the image 602. As shown, this view can provide a user with a more detailed view of the individual tracts (and their health) that are located near the tumor 608.

Figure 6D:

FIG. 6D shows a fourth image 606 in the sequence of images. The fourth image 606 shows a different view of the same brain, tracts, and tumor 608 shown in the third image 604 of FIG. 6C. In particular, the fourth image 606 corresponds to a rotation of the third image 604. For example, the user may have clicked on the brain shown in the image 604 and dragged the cursor to rotate the brain.

Figure 7:
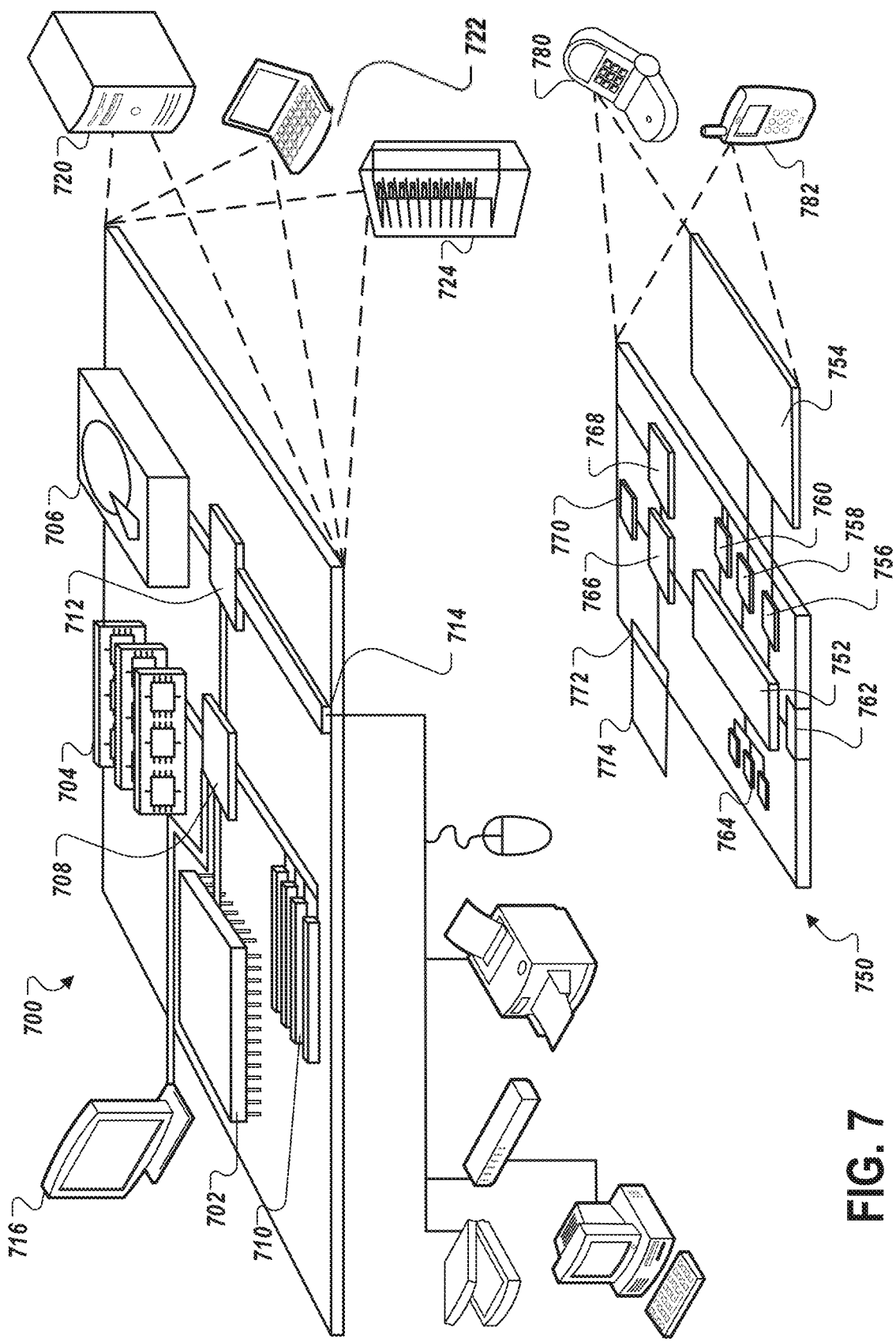
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other. In some implementations, the computing system can be cloud based and/or centrally processing data. In such case anonymous input and output data can be stored for further analysis. In a cloud based and/or processing center set-up, compared to distributed processing, it can be easier to ensure data quality, and accomplish maintenance and updates to the calculation engine, compliance to data privacy regulations and/or troubleshooting.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable sub combination. Moreover, although features may be described herein as acting in certain combinations and/or initially claimed as such, one or more features from a claimed combination can in some cases be excised from the combination, and the claimed combination may be directed to a sub combination or variation of a sub combination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

The invention claimed is:

1. A computer implemented method comprising:
forwarding, by a computer system and to a user device, patient brain data for presentation to a user;
receiving, by the computer system and from the user device, a selection of a brain parcel in response to presentation of the patient brain data;
in response to receiving the selection of the brain parcel:
identifying, by the computer system, tracts connected to the selected brain parcel; and
for at least one tract connected to the selected brain parcel:
dividing, by the computer system, the tract into a plurality of segments; and
retrieving, by the computer system, values of at least one metric for each segment of the tract;
forwarding, by the computer system and for display by the user device, tract health data comprising i) tract data for the at least one tracts connected to the selected brain parcel and ii) the values of the at least one metric for each segment of the at least one tracts connected to the selected brain parcel, the at least one metric reflecting the health of the at least one tracts connected to the selected brain parcel; and
taking an action in response to forwarding the tract health data, comprising storing, by the computer system, the tract health data in a data store.

2. The method of claim 1, wherein the at least one metric represents a deviation of the health of the tracts from a healthy control sample of tracts.

3. The method of claim 2, wherein the tracts connected to the selected brain parcel are displayed by the user device with a gradation of color that represents the deviation of the health of the tracts from a healthy control sample of tracts.

4. The method of claim 2, wherein the metric comprises a Z-score.

5. The method of claim 1, wherein only segments with respective metric values that are outside of a predetermined acceptable range are colored in the display by the user device.

6. The method of claim 1, further comprising receiving, from the user device, a selection of the at least one metric.

7. The method of claim 1, wherein the display by the user device shows the selected brain parcel.

8. The method of claim 1, further comprising receiving, from the user device, a selection of multiple brain parcels, wherein the multiple brain parcels are related to a brain network, and wherein the tract health data forwarded for display by the user comprises tract health data for tracts connected to the multiple brain parcels.

9. The method of claim 8, wherein the display by the user device shows cortical areas of the brain related to the brain network.

10. The method of claim 1, wherein the at least one metric comprises a metric that represents a measures of white matter health or integrity.

11. The method of claim 1, wherein the at least one metric comprises fractional anisotropy, mean diffusivity, or bundle thickness.

12. The method of claim 1, further comprising receiving, from the user device, selection of a tumor, wherein in response to receiving the selection of the tumor the display by the user device shows the tumor.

13. The method of claim 1, wherein forwarding patient brain data for presentation to the user comprises forwarding, for display by the user device, data that represents a three dimensional image of a brain, wherein the three dimensional image of the brain shows multiple tracts.

14. The method of claim 1, wherein taking an action in response to forwarding the tract health data further comprises initiating a clinical or therapeutic treatment.

15. A computer system comprising:
one or more computers, and
one or more computer-readable media coupled to the one or more computers having instructions stored thereon which, when executed by the one or more computers, cause the one or more computers to perform operations comprising:
forwarding, by the computer system and to a user device, patient brain data for presentation to a user;
receiving, by the computer system and from the user device, a selection of a brain parcel in response to presentation of the patient brain data;
in response to receiving the selection of the brain parcel:
identifying, by the computer system, tracts connected to the selected brain parcel; and
for at least one tract connected to the selected brain parcel:
dividing, by the computer system, the tract into a plurality of segments; and
retrieving by the computer system, values of at least one metric for each segment of the tract;
forwarding, by the computer system and for display by the user device, tract health data comprising i) tract data for the at least one tracts connected to the selected brain parcel and ii) the values of the at least one metric for each segment of the at least one tracts connected to the selected brain parcel, the at least one metric reflecting the health of the at least one tracts connected to the selected brain parcel; and
taking an action in response to forwarding the tract health data, comprising storing, by the computer system, the tract health data in a data store.

16. The system of claim 15, wherein the at least one metric represents a deviation of the health of the tracts from a healthy control sample of tracts.

17. One or more non-transitory computer-readable media having instructions stored thereon that, when executed by one or more processors, cause performance of operations comprising:
forwarding, by a computer system and to a user device, patient brain data for presentation to a user;
receiving, by the computer system and from the user device, a selection of a brain parcel in response to presentation of the patient brain data;
in response to receiving the selection of the brain parcel:
identifying by the computer system, tracts connected to the selected brain parcel; and
for at least one tract connected to the selected brain parcel:
dividing, by the computer system, the tract into a plurality of segments; and
retrieving, by the computer system, values of at least one metric for each segment of the tract;
forwarding, by the computer system and for display by the user device, tract health data comprising i) tract data for the at least one tracts connected to the selected brain parcel and ii) the values of the at least one metric for each segment of the at least one tracts connected to the selected brain parcel, the at least one metric reflecting the health of the at least one tracts connected to the selected brain parcel; and taking an action in response to forwarding the tract health data, comprising storing by the computer system, the tract health data in a data store.

* * * * *